United States Patent Office 3,492,551
Patented Jan. 27, 1970

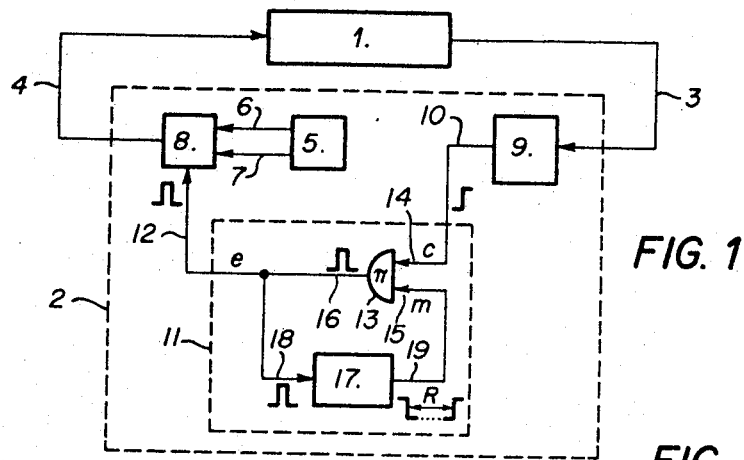
FIG. 1
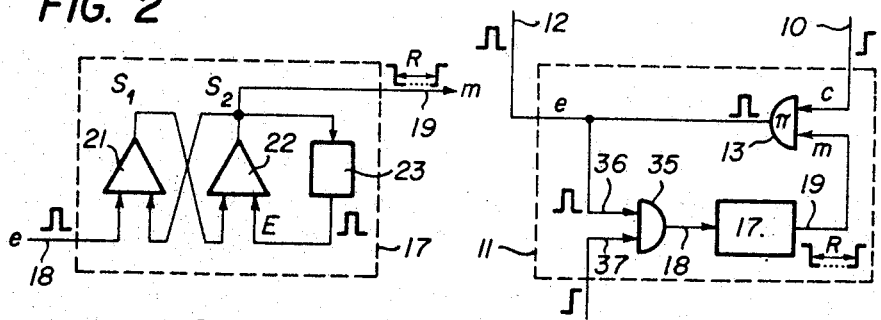
FIG. 2
FIG. 5
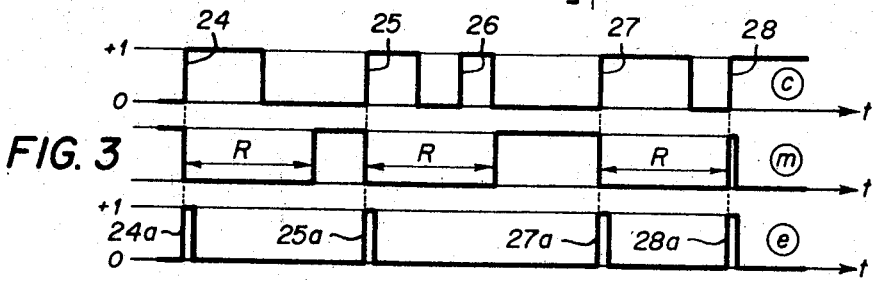
FIG. 3
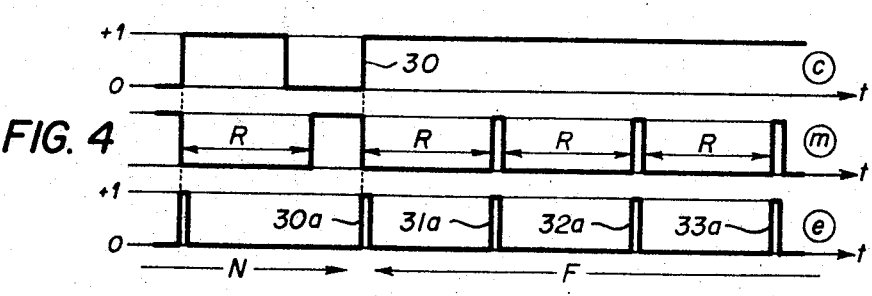
FIG. 4

3,492,551
METHOD OF ELIMINATING, IN PLUS OR MINUS SERVOCONTROLS, FORTUITOUS REVERSALS OF THE CORRECTION SIGN AND APPARATUS FOR CARRYING OUT THIS METHOD
Roland Rouxel, Troinex, Geneva, Switzerland, and Jean Helein, Fresnes, France, assignors to Compagnie Francaise Thomson-Houston, Paris, France
Filed Dec. 21, 1965, Ser. No. 515,305
Claims priority, application Switzerland, Dec. 21, 1964, 16,442/64
Int. Cl. H02p 5/46
U.S. Cl. 318—18                                  2 Claims

ABSTRACT OF THE DISCLOSURE

Apparatus is provided for cooperating with a process means for performing an industrial process having an inherent lag. A calculating means determines when the process departs from an acceptable norm, and a regulating means transmits a corrective signal to the process means under the control of the calculating means. A sign determining means determines whether the correction is to be positive or negative, and a further means is provided to prevent reversal of the sign during a period corresponding to the inherent lag.

---

This invention relates to a method of eliminating fortuitous reversals in plus or minus servocontrols which operate by reversing the sign of a correction applied to a regulating quantity and which act on an industrial process having an inherent lag.

In plus or minus servocontrols, it is known to act cyclically on each regulating quantity by causing it to vary at a speed whose sign is reversed at particular instants, termed switching instants. A U.S. Pat. 3,346,726 describes a plus or minus servocontrol for achieving optimum operation.

In this latter servocontrol, a reversal occurs each time a so-called switching quantity, worked out from an operating criterion which is itself determined from quantities measured on the process, exceeds a predetermined value. By way of switching quantity, the operating criterion time derivative to the order $n$ can for example be taken and, as switching instants, those that coincide with the passing of this derivative through zero, in the positive to negative direction, may be selected. In such a case, the desired working conditions are the optimum conditions corresponding to the operating criterion. One may also take any other switching quantity adapted to the type of installation to be controlled and select as switching instants those instants when this switching quantity exceeds a predetermined value corresponding to the desired working conditions, such and said to correspond to the desired working conditions, such exceeding indicating that the regulating quantity has reached and exceeded the value corresponding to these desired working conditions. These are so-called natural switchovers. If the switching quantity does not exceed the value corresponding to the desired working condition, it is because the regulating quantity is evolving in an unfavorable direction, in which case periodic reversals are made to occur at so-called forced switching instants which succeed one another at regular intervals. As most industrial processes have an inherent lag, the effect of a reversal of the speed at which a regulating quantity varies will only become apparent when a length of time equal to this inherent lag has elapsed. That is why the period of the forced switchovers is given a value equal to or greater than the lag. Servocontrols of this type suffer however from the drawback that there is nothing to prevent disturbance signals from causing fortuitous reversals and hence delaying the process from reaching the desired working conditions. A systematic and effective elimination of disturbance signals, as for example by filtering, is subject to considerable difficulties, both theoretical and practical, and thus constitutes a drawback which is common to all plus or minus servocontrols.

The invention tends, by providing a method of eliminating these fortuitous reversals, to render plus or minus servocontrols, acting on industrial processes having an inherent lag, insensitive to disturbance signals. This method comprises observing, at least after each reversal of the sign of the correction made to the regulating quantity, a dead etime of given length, and prohibiting during said dead time any subsequent reversal of the sign of said correction.

The length of this dead time is advantageously substantially equal to the inherent lag of the installation. However, even if this condition is not strictly satisfied, the method is effective inasmuch as it enables the servocontrol to bring the process more quickly to the required working conditions than had no dead time been observed.

The dead time is preferably observed not only after each switchover, whether natural or forced, but also whenever the regulating quantity begins to be varied.

The invention also relates to apparatus for eliminating fortuitous reversals in a plus or minus servoregulator which controls an industrial installation having an inherent lag and which includes a correction device capable of generating a correction signal applied to a regulating quantity, a reversing device capable of reversing the sign of this correction under the action of a control signal, and a calculation device capable of supplying this control signal in the form of a transition of its output quantity.

This apparatus comprises, according to the invention, an AND element having two inputs and an output, and a time delay service having an input connected to the output of the AND element and having an output connected to one of the inputs of said AND element, the other input of said AND element being connectable to the calculation device of the servoregulator and its output being moreover connectable to the reversing device of the servoregulator, said time delay device being adapted to subject its output voltage, when its input receives said control signal, to a transition having a direction opposite to that forming this signal and, at the end of a delay of given length, to a transition having the same direction as that forming said signal, said output quantity remaining unchanged when the input of the time delay device undergoes a transition opposite to that forming the control signal, whereby said apparatus forms an inhibiting device capable of prohibiting, during the dead time constituted by said delay, the transmission of any signal between the calculation device and the reversing device, the beginning of this dead time coinciding at least with the appearance of a control signal.

For a better understanding of the invention, and to show how it may be carried into effect, the same will now be described by way of example with reference to the accompanying drawings, in which:

FIGURE 1 is a diagram representing an installation controlled by an electric plus or minus servoregulator fitted with apparatus according to the invention;

FIGURE 2 is a diagram part of this apparatus;

FIGURES 3 and 4 are diagrams illustrating the operation of this apparatus; and

FIGURE 5 is a diagram concerning a variant.

In FIGURE 1, there is a diagrammatically shown an industrial installation 1 controlled by an electric servo-regulator 2 which is connected to the installation by a channel 3 conveying the signals representing the measured quantities and by a channel 4 conveying the correction signals. By the term "channel" is meant a set of lines that are each assigned to the transmission of a measured quantity or to the transmission of corrections intended for a regulating quantity, as the case may be.

The servoregulator 2 comprises a correction device 5, capable of generating a correction signal appearing with a positive sign at its output 6 or with a negative sign as its output 7, a reversing device 8, insuring the connection between the channel 4 and one or the other of outputs 6 and 7 if the correction device 5, a calculation device 9 capable of delivering a control voltage at its output 10, and an inhibiting device 11, whose input is connected to the output 10 of the calculation device 9 and whose output 12 transmits a control signal to the reversing device 8 so as to bring about the reversal of the sign of the correction signal transmitted by channel 4. The reversing device 8, which is not shown in detail, comprises inter alia a switch 8 followed by a selector, the function of the latter being to put into operation, in accordance with a law which need not be indicated here, the various lines of channel 4, each of these lines being assigned to one of the regulating quantities. To simplify the description, it will be assumed that there is only one regulating quantity, it being understood that, in the general case, the regulating quantities are each similarly acted upon cyclically. The calculation device 9 is also not illustrated in detail as the manner in which it determines the control voltage from the various measured quantities bears no relation to the present invention. In the described example, this calculation device delivers at its output 10 a voltage which is zero when the regulating quantity approaches the value corresponding to the desired working conditions, and which is positive when the regulating quantity digresses from this value, the transition from a zero value to a positive value constituting the control signal which indicates that the installation is beginning to drift away from the desired working conditions and which actuates the reversing device 8.

The inhibiting device 11 comprises and AND element 13 having two inputs 14 and 15 and an output 16 connected to the output 12 of the inhibiting device as such, and a time delay device 17 having an input 18 connected to the output 16 of the AND element 13, and an output 19 connected to the input 15 of the AND element 13. The latter is thus connected in feedback relation via its input 15 through the time delay device 17.

The time delay device 17 can be constructed in any suitable manner, for example (FIGURE 2) by means of two NOR elements 21 and 22 interconnected to form a flip-flop, one of the NOR elements, here element 22, being shunted by a delay element 23. The latter is adapted to generate a positive impulse appearing at its output after a given length of time, termed to delay time, has elapsed after the appearance of a transition of the voltage at its input.

The input of the NOR element 21 constitutes the input 18 of the time delay device 17 whereas the output of the NOR element 22 constitutes the output 19 thereof.

The circuits are arranged so that their inputs and their outputs convey voltages which each changeover between a positive value and a zero value, and it is proposed to adopt the convention of giving to the logic variable representing voltage at the input or at the output of a circuit the value $+1$ when this voltage is positive and the value zero when this voltage is nil. This convention is of a general character and is applicable to all circuits of the inhibiting device 11, including its input 10 and its output 12.

The operation of the apparatus is as follows:

It will be assumed that the calculation device 9 (FIGURE 1) is adapted to deliver zero voltage as long as the regulating quantity evolves in a favorable direction (i.e., towards a described value) and a voltage equal to $+1$ when this evolution occurs in an unfavorable direction (i.e., away from the desired value). This voltage thus defines the favorable or unfavorable nature of the way in which the working conditions of the installation evolve and constitutes the logic quantity $c$ that is present at the input of the inhibiting device 11. A transition of this quantity from the value $c=0$ to the value $c=+1$ means that the evolution has ceased to be favorable ($c=0$) and has become unfavorable ($c=+1$). The AND element 13 forms a gate which either allows or prohibits this signal from reaching the reversing device 8 and which gives it the form of an impulse. If the AND element 13 allows the passage of this signal, the reversing device 8 receives a control impulse $e$ and reverses the sign of the correction transmitted via channel 4. This signal $e$ also reaches the input 18 of time delay device 17 which delivers at its output 19 a signal $m$. As will be seen, this signal $m$ passes from zero to $+1$ or vice versa. The delay element 23 (FIGURE 2) forms a positive impulse which appears, with a delay R, each time the flip-flop formed by elements 21 and 22 changes over, i.e., each time the logic quantity $m$ changes value, and this delayed impulse is applied to the input of the NOR element 22.

Supposing that, at the beginning of a control operation, the regulating quantity evolves in a favorable direction, i.e. $c=0$, and that the flip-flop is in the condition $S_1=0$, $S_2=m+1$, $S_1$ and $S_2$ representing the logic quantities appearing at the outputs of elements 21 and 22 respectively. Thus, at the output of the AND element 13 there is a zero signal, but this element is ready to transmit to the reversing device 8 the $+1$ signal that will be supplied by the calculation device 9 whenever an unfavorable evolution will have been detected. At the instant variable $c$ passes from zero to $+1$, element 13 will thus be delivering a transition $e=0$ to $e=+1$ which reaches the input of time delay device 17 and the flip-flop 21, 22 (FIGURE 2) changes over to the condition $S_1=+1$, $S_2=m=0$. This change-over has the effect of cancelling out quantity $e$. After a lapse of time equal to R, the input of the delay element 23 delivers a positive impulse which returns the flip-flop to the initial condition $S_1=0$, $S_2=m=+1$.

In FIGURE 3, this succession of conditions is shown by a curve which is representative of $m$ and in which are seen to appear te periods, having a length of time R, during which $m$ has a value of zero. As long as $m$ has a value of zero, the AND element 13 (FIGURE 1) prohibits any subsequent change of quantity $c$ from reaching the reversing device 8. As soon as this length of time R has elapsed, the AND element 13 will again be ready to transmit the signal formed by a transition, from the value $c=0$ to $c=+1$, of the voltage delivered by the calculation element 9. It will thus be seen that the AND element 13 will be blocked for the length of time R by the time delay device 17 so that, during this dead time, a transition appearing fortuitously at the output 10 of the calculation device 9 has no effect on the reversing device 8. If this length of time R is given a value substantially equal to the inherent lag of the installaiton, the apparatus is able to prohibit the passage of a transition such as transition 26 (FIGURE 3), which, since it follows the previous transition 25 with a lag of less than R, can only be a disturbance. If such a disturbance were not inhibited, it would cause a fortuitous reversal of the sign of the rate at which the regulating quantity varies. As this reversal is not conditioned by the operational evolution of the installation resulting from the reversal caused by the previous transition 25, it would have an unfavorable effect and would cause the installation to digress from the desired working conditions. The apparatus thus does indeed bring about the elimination of fortuitous reversals by inhibiting those signals which could cause such reversals and by only allowing those signals which correspond to transitions separated from one another by a length of time greater than the inherent lag of the installation to proceed to the reversing device 8. Accordingly, only transitions 24, 25, 27 and 28 of curve c give rise to the impulses 24a, 25a, 27a and 28a of curve e, which impulses bring about reversals, whereas the fortuitous transition 26 is inhibited.

If the lag R is less than the inherent lag of the installation, the apparatus will let a certain proportion of the disturbance signals through; if this lag is greater than the inherent lag, the apparatus is liable to inhibit, in addition to the disturbance signals, some of the true transitions generated by the calculation device 9 (FIGURE 1). The apparatus will thus become fully effective only when the lag R is as close as possible to the inherent lag of the installation.

It will be observed that if, as a result of a reversal triggered off by an impulse 30a (FIGURE 4, curve e), itself caused by a transition 30 (curve c), the calculation device ascertains an unfavorable operational evolution of the installation and consequently comes to deliver a voltage which remains constantly positive, such a voltage will give rise, at the output 12 of the inhibiting device, to a positive impulse as soon as the time delay device 17 will have given, after the delay R, the value +1 back to the variable m. This will immediately bring about the creation of a new impulse e, which in the present case would be impulse 31a. Similar impulses will recur periodically, with a period R, as long as the calculation device 9 delivers a voltage $c=+1$. This is what is shown by impulses 32a, 33a, etc. in curve e. These impulses each bring about, through the intermediary of the reversing device 8, the reversal of the sign of the regulating quantity variation. The existence of these impulses renders the apparatus particularly suitable for the optimum control mentioned earlier as the inhibiting device 11 itself generates the periodic impulses corresponding to the forced switchovers.

Referring more particularly to optimum control, it can, in short, be stated that when the time delay device delivers a positive voltage, it is the occurrences of a positive voltage at the output of the calculation device that trigger off the signals causing the reversals: these are the natural switchovers N; and that when the calculation device delivers a positive voltage, it is the periodic occurrences of a signal $m=+1$ which trigger off the signals causing the reversals: these are then the forced switchovers F, which follow one another with a period R.

To render the apparatus able to begin inhibition immediately after starting a control operation, i.e. without waiting for the first switchover to occur, the inhibiting device 11 may be provided, by way of variant, with an OR element 35 (FIGURE 5) having two inputs, of which input 36 is connected to the output of the AND element 13 and of which the input 37 receives the signal that triggers off a control operation. The output of this OR element 35 constitutes the input 18 of time delay device 17. Under these conditions, the time delay device 17 is started either by a control signal or by the signal triggering off the start of the control operation.

The described apparatus is of the electrical type as in this particular example it is adapted to an electric servoregulator. It is clear however that the apparatus can be of a different type, e.g. pneumatic or hydraulic, for, as is known, all of the logic elements used therein exist not only in the form of electrical elements, but also in the form of hydraulic elements and of pneumatic elements.

What is claimed is:

1. Apparatus for eliminating fortuitous reversals in a plus or minus servoregulator which controls an industrial installation having an inherent lag and which includes a correction device capable of generating a correction signal to be applied to a plus or minus servocontroller, a reversing device capable of reversing the sign of this correction under the action of a control signal, and a calculation device capable of delivering this control signal in the form of a transition of its output quantity, said apparatus comprising an AND element having two inputs and an output, and a time delay device having an input connected to the output of the AND element and having an output connected to one of the inputs of said AND element, the other input of said AND element being adapted for receiving said control signal from said calculation device and its output being moreover adapted for conditionally delivering said control signal to said reversing device, said time delay device being adapted to subject its output quantity, when its input receives said control signal in the form of a transition, to a transition having a direction opposite to the transition generating this signal and, at the end of a delay of given length, to a transition having the same direction as that generating said signal, said output quantity remaining unchanged when the input of the time delay device undergoes a transition opposite to that forming the control signal, whereby said apparatus forms an inhibiting device capable of prohibiting, after each occurrence of a control signal and during a dead time constituted by said delay, the transmission from the calculation device to the reversing device of any further signal that may appear during said dead time, the beginning of this dead time coinciding at least with the occurrence of a control signal, and of permitting the transmission of a further signal only after the lapsing of said dead time.

2. Apparatus according to claim 1, wherein said delay is substantially equal in length to the inherent lag of said installation.

References Cited
UNITED STATES PATENTS 2,995,694   8/1961   Sorkin et al.
3,412,298   11/1968   Rosner _____ 318—18

THOMAS E. LYNCH, Primary Examiner

U.S. Cl. X.R.

318—78